United States Patent [19]

Muschelnautz et al.

[11] 4,337,074
[45] Jun. 29, 1982

[54] PROCESS FOR PRODUCTION OF MINERAL WOOL FIBERS

[75] Inventors: Edgar Muschelnautz, Leverkusen; Norbert Rink, Dormagen, both of Fed. Rep. of Germany

[73] Assignee: Bayer Aktiengesellschaft, Leverkusen, Fed. Rep. of Germany

[21] Appl. No.: 251,808

[22] Filed: Apr. 7, 1981

[30] Foreign Application Priority Data

Apr. 25, 1980 [DE] Fed. Rep. of Germany ....... 3016114

[51] Int. Cl.³ ............................................ C03B 37/06
[52] U.S. Cl. ............................................ 65/5; 65/9; 65/16
[58] Field of Search ............................ 65/4.4, 9, 5, 16

[56] References Cited

U.S. PATENT DOCUMENTS

| | | | |
|---|---|---|---|
| 2,224,466 | 12/1940 | Baker et al. | 65/16 |
| 2,961,698 | 11/1960 | Rea | 65/4.4 |
| 3,773,483 | 11/1973 | Schmidt | 65/5 X |
| 3,787,195 | 1/1974 | Kirchheim | 65/9 |
| 3,881,903 | 5/1975 | Stalego | 65/16 |
| 4,060,355 | 11/1977 | Walz et al. | 65/16 X |

*Primary Examiner*—Robert L. Lindsay, Jr.
*Attorney, Agent, or Firm*—Sprung, Horn, Kramer & Woods

[57] ABSTRACT

In a process for the production of mineral wool fibers according to the jet blast process, comprising issuing at least one melt stream from at least one opening in the base of a melting crucible into a converging-diverging drawing nozzle, flowing a gaseous blasting medium into the nozzle substantially parallel to the melt stream so as to separate the melt stream into fibers, the blasting medium being drawn into the nozzle by suction due to a drop in pressure produced between the nozzle inlet and outlet, and passing the fibers and sent blasting gas into a diffuser connected downstream of the nozzle to reduce the gas rate of flow, the improvements which comprise effecting (a) a maximum drop pressure in the inlet of the drawing nozzle;
(b) a minimum drop pressure in the diverging portion of the drawing nozzle over a maximum length without separation (transition) of the laminar boundary layer;
(c) the subsequent pressure conversion initially with a shock at a constant cross-section of the drawing nozzle and subsequently in a subsonic diffuser.

6 Claims, 12 Drawing Figures

PROCESS FOR PRODUCTION OF MINERAL WOOL FIBERS

The present invention relates to a process for the production of mineral wool fibers according to the jet blast process, in which melt streams flowing out under the effect of gravity and additional pressure forces, from melt outlet openings positioned on the underside of a crucible containing the mineral melt are separated into fibers, are drawn out and are cooled at solidification temperature while passing through drawing nozzles, under the effect of gases flowing at a high speed, substantially parallel to the melt streams. The process for the production of mineral wool was suggested in 1922 (German Pat. No. 429,554).

In contrast with those processes for the production of mineral wool in which the operation of separating into fibers take place using centrifugal forces, the jet blast process has the advantage that there does not have to be used any moving parts which come into contact with the mineral melt streams. In the jet blast process, the operation of separating into fibers takes place in a purely aerodynamic manner using air, steam or other gases.

A jet blast process for the production of mineral wool is suggested in British Pat. No. 928,865, in which the operation of separating into fibers takes place in two successive blasting stages, whereby after a first operation of separating into fibers in the first blasting stage, a second operation of separating into fibers then takes place with a change in direction. In the second blasting stage, thicker, undrawn fibers which are subject to a slower cooling and therefore are still adequately viscous in the second blasting stage, are also drawn out; fibers which have been drawn out in the first blasting stage so that they are adequately thin should already have cooled down to such an extent upon entering into the second blasting stage that a further drawing-out operation cannot take place.

The fiber formation process in the jet blast process is so far substantially unclear. The calculation may be made from the quantity of wool produced per melt outlet opening of the crucible per unit time and from the average fiber diameter that, according to the prior art, approximately 4000 m fiber are produced per second from each nozzle opening. The rate of flow of the drawing-out blasting medium is approximately sonic speed, i.e. between 300 and 400 m/s. Even when the assumption is made that the fiber reach the maximum speed of the blasting medium, then at least 12 separate fiber are drawn out from one melt stream. Therefore, the assumption is made according to U.S. Pat. No. 2,206,058 that the melt stream is accelerated very considerably and is simultaneously attenuated upon entering into the blasting medium and approaches the speed of the blasting medium. While the melt stream continues its path through the nozzle, parts thereof exhibit the tendency of moving sideways whereby, as a result, they enter into a zone of the blasting medium which is at a different speed. Other parts of the melt stream remain in the zones which have a high speed and overtake the parts initially mentioned which entered into the zone of slower speed. As a result, the melt stream moves in a looped or zig-zag motion. Therefore, according to this idea, the fibers have to be drawn out inside the nozzle in the manner of a multiple whip crack effect, where a multiplication of the fibers occurs.

This idea for the operation of separating into fibers led to the development of a process according to U.S. Pat. No. 3,874,886 which does not use drawing nozzles. According to this suggestion, the melt stream enters into a gas flow at an angle and is struck therein by a gas stream and is drawn out into fibers utilizing this whip crack effect. However, a process of this type is difficult to control because there is no guidance for the different gas flows and streams.

The present invention is based on the idea that the operation of separating into fibers, i.e. the multiplication of the melt streams into a plurality of fibers is effected by the pressure drop in the inlet of the drawing nozzle. Accordingly, the melt stream is already split up into individual streams in the inlet of the drawing nozzle, the individual streams being drawn out within the drawing nozzle, optionally with further multiplication.

Thus, an object of the present invention is to provide a process for the production of mineral wool fibers, in particular rock wool fibers, according to the jet blast process, in which at least one melt stream issues from at least one opening in the base of a melting crucible, which melt stream is separated into fibers in a converging-diverging drawing nozzle by a gaseous blasting medium which flows substantially parallel to the melt stream at sonic speed and/or supersonic speed, whereby the blasting medium is drawn into the nozzly by suction, by a pressure drop which is produced between the nozzle inlet and nozzle outlet, and the rate flow is reduced in a diffuser connected downstream, characterized by the following features:

(a) A maximum pressure drop is in the inlet of the drawing nozzle;
(b) a minimum pressure drop is in the diverging portion of the drawing nozzle over a maximum length without a transition or separation of the laminar boundary layer to turbulent flow;
(c) the subsequent pressure conversion takes place initially with shock at a constant cross-section of the drawing nozzle and then in a known manner in a subsonic diffuser.

Another object of the present invention is to provide an apparatus for carrying out the process.

The present invention is explained in detail with reference to the accompanying drawings, wherein.

Figure 1:
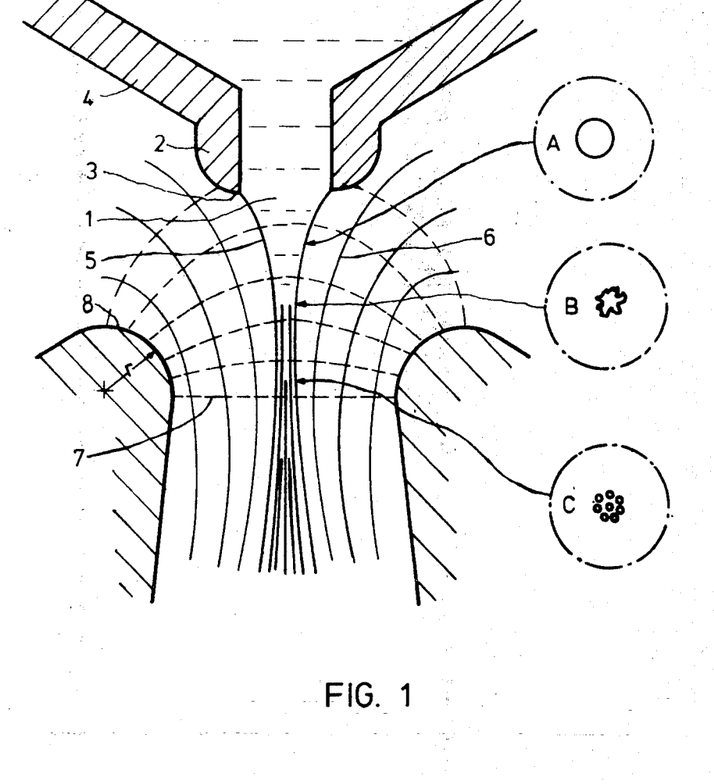
FIG. 1 is a schematic sectional view showing the melt stream at the inlet into the drawing nozzle.

The numerals specified in the figures identify in particular the following:

1 The melt stream
2 Nipple on the underside of the crucible
3 Melt outlet opening
4 Melting crucible
5 Contour of the melt stream
6 Flow line of the blasting medium
7 Plane of the narrowest drawing nozzle cross-section
8 Converging portion of the drawing nozzle
9 Diverging portion of the drawing nozzle (Laval portion)
10 Outlet plane of the diverging portion
11 Portion of the drawing nozzle with a constant cross-section (shock portion)
12 Subsonic diffuser
13 Mixing zone for the blasting medium and propulsion jet medium
14 Propulsion jet nozzle
15 Supply line for the propellant
16 Inflow channel for the propulsion jets
17 Boundary wall of the inflow channel 16
18 Hot gas supply at the melt outlet
19 Flames to produce the hot gas
20 Vacuum chamber for removing the laminar boundary layer by suction
21 Suction-removal slit for the laminar boundary layer
22 Dividing plate for preventing transverse flows in the diffuser
23 Mixture feed
24 Spiral conveyor
25 Melting furnace
26 Melt
27 Forehearth
28 Addition of binder
29 Conveyor belt
30 Fan
31 Purification of outgoing air
32 Raw mat
33 Mat compression
34 Hardening furnace The concept on which the invention is based, concerning the process of separating into fibers, will firstly be explained with reference to FIG. 1:

The melt stream 1 issues at 3 from the nipple 2 at the base of the melting crucible 4. The melt stream is accelerated due to the suction effect of the blasting medium flowing into the drawing nozzle, whereby the cross-section of the melt flow contracts. If there is a large enough drop in pressure in the inlet of the drawing nozzle, the melt stream achieves a contour 5 which has a steeper curve than the flow line 6 of the blasting medium so that the melt stream is surrounded by a zone of low pressure. The forces exerted thereby on the melt stream transversely to the direction of flow initially causes a fringing (cross-section B) of the cross-section of the melt stream which is initially circular (cross-section A) immediately after issuing from the nipple. During its further course into the drawing nozzle, the melt stream breaks down into a plurality of individual streams (cross-section C). The decomposition into individual streams is completed upon reaching the narrowest cross section 7 of the drawing nozzle.

The thread multiplication in the inlet of the drawing nozzle may reach values of from 30 to several 100, i.e. from 30 to 100 individual threads result, each from the melt stream issuing from the melting crucible.

The ratio of the pressures at the narrowest cross-section of the drawing nozzle and of the surroundings of the crucible cannot fall below 0.528. In this case, the blasting medium reaches sonic speed at the narrowest cross section of the drawing nozzle. This pressure drop should now take place according to the invention in the inlet of the drawing nozzle with the largest possible fall in the shortest possible distance. This is achieved by the shaping of the nozzle in the converging portion 8. The curvature of the contour of the drawing nozzle is preferably shaped such that the flow line of the blasting medium can still just follow it. The curvature should be greater than the naturally developing flow pattern contour of the inlet flow into a Borda-opening or an orifice in which the converting part is reduced to one edge. The optimum curvature is appropriately determined by experiments. It has been found that the contour for achieving a maximum pressure drop in the inlet of the nozzle extends between two concentric arcs of a circle with radii of about $r_1 = 28\%$ and $r_2 = 50\%$, preferably $r_2 = 32\%$, of the width b of the drawing nozzle at its narrowest cross section. A good approximation of the maximum pressure drop is achieved when the contour is described through an arc of a circle with a radius $r = 30\%$ of the width of the drawing nozzle at its narrowest cross section.

The circular arc which describes the inlet contour of the drawing nozzle, preferably has a length of from 90 to 135, preferably from 110 to 120 angular degrees.

Figure 2:
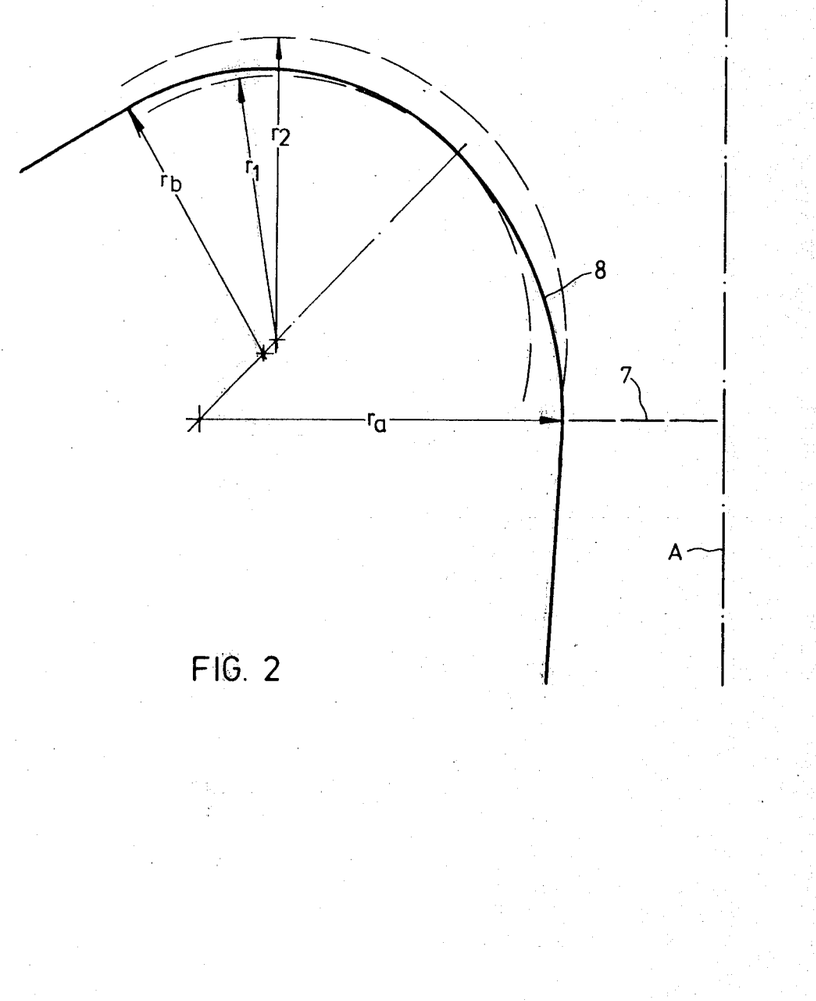
FIG. 2 is a schematic view of a particularly preferred shap of the inlet contour of the drawing nozzle.

An even better approximation of the maximum pressure drop is achieved when the contour, starting at the narrowest cross-section of the drawing nozzle is initially described through a first arc of a circle with a first radius $r_a = 40\%$ of the width of the drawing nozzle at its first cross-section with a length of from 40 to 50 angular degrees and then tangentially thereto through a second arc of a circle with a second radius $r_b = 30\%$ of the width of the drawing nozzle at its narrowest cross-section and a length of from 45 to 90, preferably 75 angular degrees. Such a contour is illustrated in FIG. 2. The figure illustrates the drawing nozzle axis A and the inlet contour 8 to half a nozzle. The inlet contour should preferably extend between the two concentric arcs of a circle (shown in dashed lines) with the radii $r_1$ and $r_2$. It is particularly preferred for the contour initially to be described through an arc of a circle with a radius $r_a$ to which a second arc of a circle with the radius $r_b$ is connected tangentially. For example, with a drawing nozzle having a width at its narrowest cross-section of 5 mm, the first radius $r_a$ having equal 2 mm and the second radius $r_b$ should equal 1.5 mm.

The melting crucible 4 is preferably positioned at such a distance from the drawing nozzle that the melt outlet opening is at a pressure level of from 0.92 to 0.98, particularly preferred at approximately 0.96, of the ambient pressure. The diameter of the melt outlet opening 3 preferably measures between 30% and 50% of the width of the drawing nozzle at its narrowest cross-section.

Figure 3:
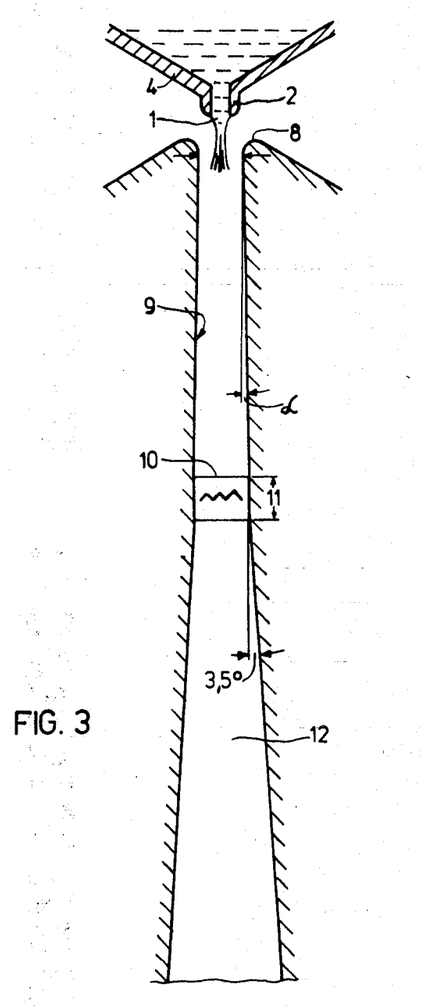
FIG. 3 is a schematic sectional view showing a drawing nozzle for carrying out the process.

Reference is made to FIG. 3 in the following.

The individual threads which have been produced by separation in the nozzle inlet are substantially drawn-out into fibers in the diverging portion 9 of the drawing nozzle. It has been found that the length of the individual threads finally forming the mineral wool is essentially determined by the conditions prevailing in the diverging portion 9 of the drawing nozzle and by its length. Pressure shocks must be avoided in this region. The blasting medium entering at sonic speed into this part of the nozzle is further accelerated according to the invention over as long a stretch as possible. The length of the diverging part of the nozzle is restricted by a laminar boundary layer developing on the wall of the nozzle which increases over the length of the nozzle and finally becomes turbulent and thereby, simultaneously, rapidly becomes thicker.

The separation of the laminar boundary layer would lead to a disturbance in the supersonic flow of the blasting medium and would thereby initiate compression shocks. The fibers which are still viscous in the diverging region would tear off, thus producing shorter fibers. Furthermore, as a result of the irregular flow conditions prevailing at this time, the formation of irregularly drawn-out melt portions, for example the production of thickened fiber ends, would be promoted and pearls would be produced as a result of a very premature and irregular tearing-off action.

Only the concept described above concerning the process of separating into fibers has led to the recognition that for the production of fibers with as small a dispersion as possible of fiber thickness and fiber length and to avoid the formation of pearls, it is necessary to provide definite flow conditions which are as undisturbed as possible for the blasting medium in the diverging portion. For example, if the diverging part was too long, the result would be a substantially uncontrollable separation of the laminar boundary layer with a substantially indefinite reaction on the supersonic flow of the blasting medium. On the other hand, a diverging portion which is too short would either not produce sufficiently finely drawn-out fibers, i.e. would produce thicker and shorter fibers, if the fibers are cooled fast enough, or, if the cooling process does not take place fast enough, the drawing-out process would be continued in regions lying further downstream, in which less definite flow conditions prevail.

It has been found that a separation of the laminar boundary layer only occurs with a diverging portion 9 of length greater than 40 mm. Therefore, according to the invention, the diverging portion 9 of the drawing nozzle preferably has a length of from 35 to 40 mm.

The expansion angle $\alpha$ of the diverging portion should preferably be between 1.8° and 2.2°, most preferably approximately 2°, so that the blasting medium undergoes a constant further acceleration with a minimum pressure drop.

The pressure at the outlet 10 of the diverging portion of the drawing nozzle is appropriately pre-determined at from 0.2 to 0.4, preferably from 0.3 to 0.35 of the ambient pressure of the crucible.

Before the fibers can be deposited to form a mineral wool mat, the flow rate of the blasting medium must be reduced. The transition from supersonic flow to subsonic flow is effected by shock waves. As has already been stated, such shock waves constitute disturbances to an ordered fiber drawing process. Therefore, according to the invention it is proposed to effect the pressure conversion by a defined shock such that a disturbance of the drawing-out process is substantially avoided. Therefore, the shock wave is forced into a region of the drawing nozzle with a constant cross-section 11. The length of the nozzle part with a constant cross-section may appropriately amount to from 50 to 80%, preferably from 60 to 70% of the width of the portion with constant cross-section.

Although for introducing and fixing the shock wave. It usually suffices to provide a region with constant cross-section, it may be appropriate also to provide smaller disturbance edges or disturbance points in the region with constant cross-section on the boundary wall of the nozzle in this region, by which the introduction and fixing of the shock wave is further ensured at a definite point. The disturbance points may also be designed in the form of fine gas streams blown into the region with constant cross-section.

Before entering into the portion with constant cross-section, the fibers should be solidified. A subsonic diffuser 12 is connected to the part with constant cross-section, in which diffuser the flow rate of the blasting medium is further reduced. The outlet speed of the blasting medium from the subsonic diffuser is preferably less than 20 m/s, particularly preferred from 5 to 15 m/s.

In order to form a fiber mat, the fibers then fall in a known manner on to a perforated conveyor belt, below which the blasting air is removed by suction.

The drawing nozzle according to the invention may in principle have a rotationally-symmetrical cross-section. In this case, a nozzle is to be provided under each melt outlet opening. Disadvantages of a nozzle having a rotationally-symmetrical cross section are the relatively small throughputs of a few kg/h per nozzle and the problem of producing a lot of nozzles with high regularity and narrow tolerances as well as the problem of exactly positioning each nozzle relative to the melt outlet opening of the crucible. Therefore, a drawing nozzle is preferred which has a slit-shaped cross section and is positioned below a row of melt outlet openings, whereby a plurality of melt streams flow into the nozzle. For example, several hundred melt outlet openings could be provided at relatively short mutual spacings. The mutual spacing may thereby only amount to a little more than double the diameter of a melt outlet opening (FIG. 10).

Figures 10, 11:
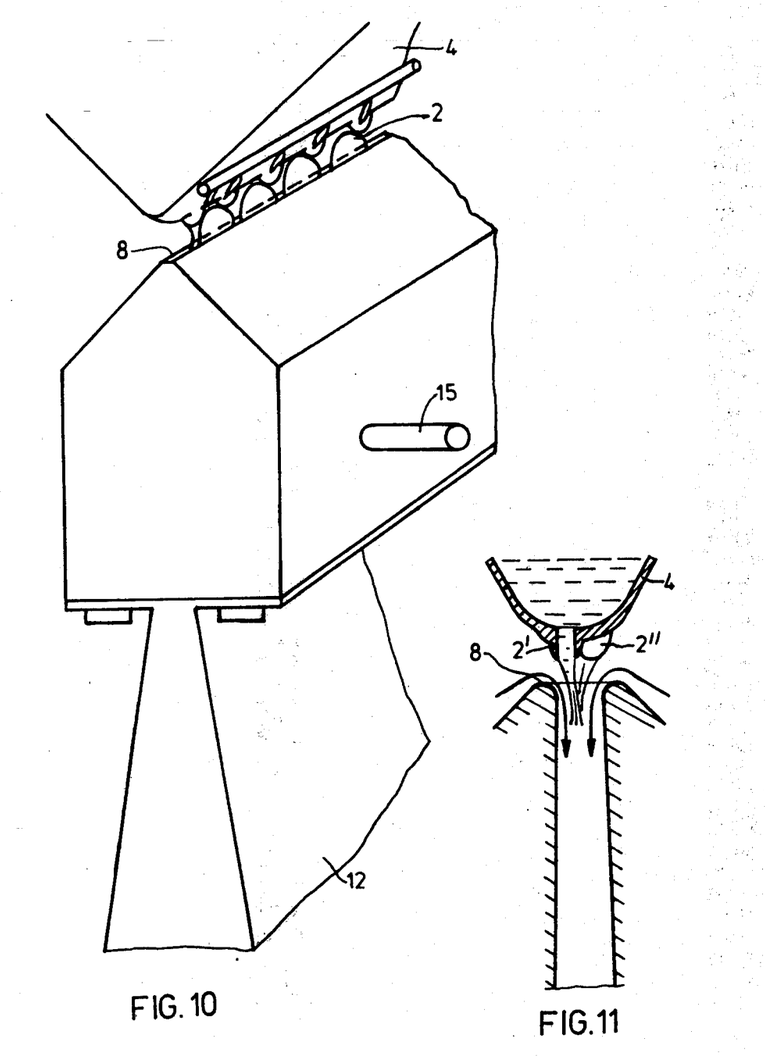
FIG. 10 is a perspective view of a slit-shaped drawing nozzle.
FIG. 11 is a schematic sectional view showing a double-row arrangement of melt outlet openings.

Higher throughputs in the drawing nozzle may be achieved when the melt outlet openings are positioned in a double row, whereby the two rows of openings are staggered "over a gap." FIG. 11 illustrates such an arrangement with two rows of melt outlet openings 2' and 2".

The pressure drop over the drawing nozzle may be produced by excess pressure in the crucible surroundings. For example, the underside of the crucible and the inlet of the drawing nozzle may be positioned in a pressure chamber in which a pressure of more than 2 bars, preferably approximately 3 bars is maintained.

Any gases, for example superheated steam or combustion waste gases, may be used as the blasting medium. For example, for separating particularly high-melting mineral fibers it may be appropriate to protect the high-grade metal crucible from corrosion by using a reducing blasting medium, for example reducing combustion waste gases from combustion with an oxygen deficit. If combustion waste gases are used as the blasting medium, it may be appropriate to produce these directly in the pressure chamber which contains the underside of the crucible with the blasting nozzle inlet. In order that the melt may issue from the crucible when carrying out the process in this manner, a corresponding hydrostatic pressure must be produced over the melt surface.

On the other hand, it is also possible to carry out the process such that the diffuser outlet opens into a low pressure chamber of, for example, from 0.1 to 0.3 bar and the ambient pressure of the crucible is at normal atmospheric pressure. Sluices must then be provided through which the fibers are conveyed into the atmosphere.

The technical means required for carrying out the process by methods in which the surroundings of the crucible and/or the fiber deposit are not at atmospheric pressure, are relatively complex.

Figure 4:
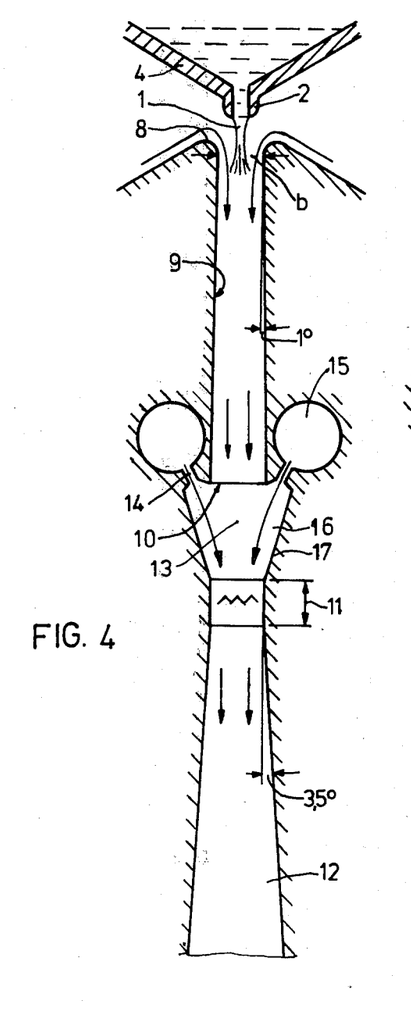
FIG. 4 is a schematic sectional view showing a specific embodiment with propulsion jet nozzles.

Therefore, the difference in pressure for producing the blasting medium flow is preferably produced by propulsion jet nozzles (FIG. 4).

For this purpose, a mixing zone 13 is provided between the outlet end 10 of the diverging portion 10 of the drawing nozzle and the inlet into the constant portion 11 of the nozzle, in which the pressure conversion takes place by shock. Propulsion jet nozzles 14 open into this mixing zone 13 and the propellant is mixed with the blasting medium therein.

Ambient air is used as the blasting medium.

In this case, air is appropriately also used as the propellant. For example, compressed air of 6 bars may be supplied via the lines 15, which air is expanded through the propulsion jet nozzles 14 and thereby reaches speeds of more than 400 m/s, preferably between 500 and 600 m/s. The propulsion jets are mixed with the remaining flow according to the invention at constant pressure or slightly decreasing pressure.

Figure 5:
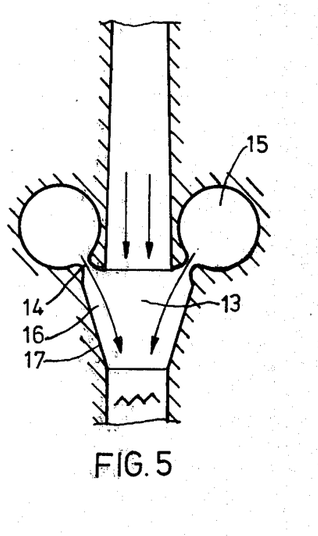
FIG. 5 is a schematic sectional view showing propulsion jet nozzles designed as Laval-nozzles.

The propulsion jet nozzles 14 are preferably designed as Laval nozzles (FIG. 5).

The propulsion jet is guided into the mixing zone outside the nozzle such that a flow channel 16, restricted on one side with a half-sided constant or slightly converging cross-section is produced by the wall 17. The course of the cross-section over the length of the mixing zone is appropriately determined by empirical means.

Supersonic speed still prevails at the end of the mixing zone 13.

The temperature of the blasting medium is of minor significance for cooling the fibers in view of the elevation of the temperature of the mineral melt. Even the temperature of combustion gases of approximately 1000° C. is reduced in the drawing nozzle by adiabatic expansion to from 500° to 700° C. The higher viscosity of hot gases causes a greater friction between the blasting medium and the melt threads and therefore promotes the drawing-out operation. However, it is preferred according to the invention to use ambient air at room temperature as the blasting medium.

It is particularly preferred that the melt outlet openings also be blown with hot gas so that the melt streams are surrounded with a hot gas film of high viscosity. Thereby, an improved drawing-out effect is obtained by highly viscous gas under energetically, particularly favorable conditions, in that only a small quantity of the blasting medium has to be heated to an elevated temperature. The quantity of hot gas preferably constitutes from 10 to 15% of the total quantity of the blasting medium.

Figure 6:
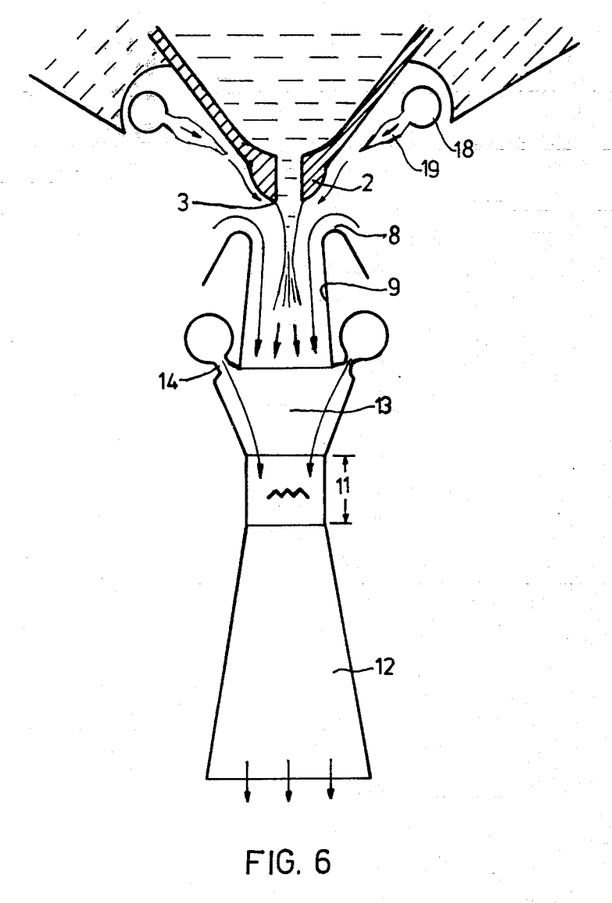
FIG. 6 is a schematic sectional view showing a drawing nozzle with a hot gas flow against the melt threads.

The hot gas film surrounding the melt streams may be produced, for example, in that small gas supply pipes 18 (FIG. 6) with bores provided towards the melt outlet openings 3 are provided on both sides of and above the row of melt outlet openings, through which pipes issues and burns 19 an easily combustible gas, optionally previously mixed with air, for example hydrogen or acetylene. The protection by the hot gas of the melt outlet openings from being cooled too much by the blasting medium flowing into the drawing nozzle thereby also has a favorable effect.

All mineral melts which may be drawn out into fibers may be used as melts. For example, rock, slag and glass melts may be separated into fibers. Optimum drawing-out conditions may be respectively set by controlling the pressure with which the propulsion jet nozzles are charged, so that adaption may be made to different temperatures and optionally to viscosities of the different mineral melts.

Figure 7:
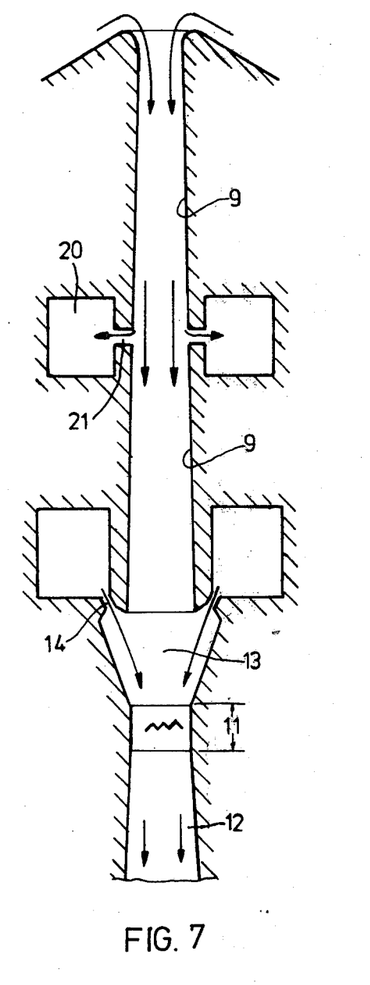
FIG. 7 is a schematic sectional view showing a drawing nozzle with a suction-removal of the laminar boundary layer.

If a particularly thin fiber, for example less than 5 $\mu$m is required, it is also possible to extend the diverging portion 9 of the drawing nozzle by removing the laminar boundary layer by suction in a plane transverse to the direction of flow. The diverging portion 9 of the drawing nozzle has a slit 21 opening into a vacuum chamber 20, in a plane transverse to the direction of flow, through which slit the laminar boundary layer flow is removed by suction. In this case, it is possible to extend the diverging portion of the drawing nozzle to from 60 to 100 mm. As a result of repeatedly removing the boundary layer by suction, even longer nozzles with a laminar boundary layer may be obtained.

Figure 8:
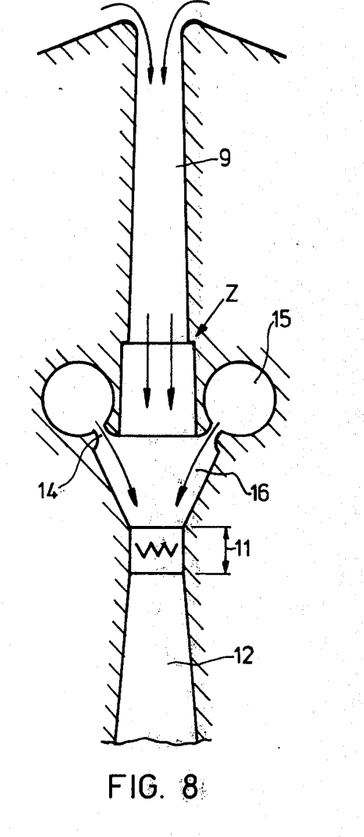
FIG. 8 is a schematic sectional view showing the diverging portion of the drawing nozzle.

If only a relatively restricted extension of the diverging portion of the drawing nozzle is required, then a disturbance in the supersonic flow of the blasting medium by the laminar boundary layer formation may also be prevented by retracting the nozzle wall at the point at which the separation takes place and thus providing additional space for a turbulent boundary layer. This is shown in FIG. 8. The diverging portion 9 of the drawing nozzle is suddenly expanded at point Z where the separation takes place. The expansion should be effected by approximately from 1 to 1.5 mm on each side. In this manner, the diverging portion of the drawing nozzle may be extended to from 50 to 65 mm without removing the boundary layer by suction.

Figure 9:
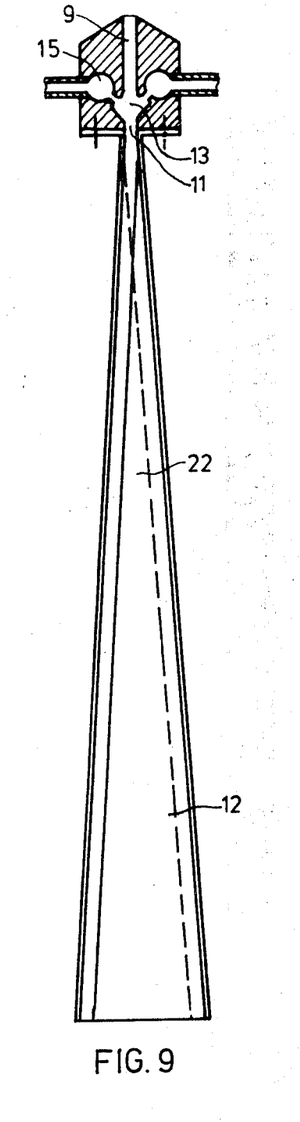
FIG. 9 is a schematic sectional view showing the diffuser with transverse flow obstructions.

In the case of slit-shaped drawing nozzles, into which flow a number of melt streams, for example several hundred melt streams, the danger exists in particular in the subsonic diffuser that, as a result of varying pressure increases with a slightly varying flow impulse in the depth of the slit (vertical to the drawing plane), transverse streams and separations from the flow develop which prevent a regular fiber exit at the outlet of the diffuser. Therefore, flow obstructions are preferably provided to prevent transverse flows in the diffuser. The flow obstructions may be designed, for example, as dividing plates which extend over at least a part of the diffuser cross-section. They preferably only extend over a part of the cross-section of the diffuser. The top edge of the dividing plates should form an angle of less than 45°, preferably less than 30° with the longitudinal plane of the drawing nozzle. A preferred embodiment of the dividing plates is shown in FIG. 9. The dividing plate 22 is connected on one side with one half of the drawing nozzle. The other edge of the diffuser extends somewhat parallel to the opposite side of the diffuser. This design of the dividing plates prevents the fibers from being deposited thereon. Fibers which impinge on the dividing plate are carried along by the flow on the edge of the dividing plate to the outlet of the diffuser. The spacing of the individual dividing plates in the diffuser should be smaller than the width of the diffuser at the outlet and greater than a third of this width. Several dividing plates are respectively positioned alternately on both sides of the diffuser. The top edges of the plates are most preferably designed with sharp edges like a knife, thereby causing as little disturbance as possible in the flow of the blasting medium.

Figure 12:
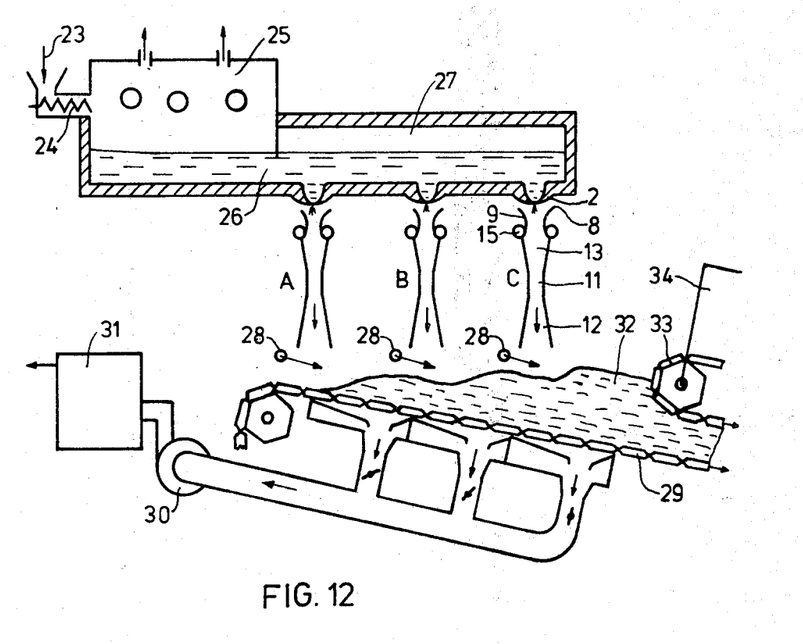
FIG. 12 is a schematic sectional view showing mat production.

FIG. 12 illustrates by way of example the industrial process for production of mineral wool mats. The mineral raw materials are continuously supplied at 23 and are conveyed into the furnace 25 by a screw 24. A tank furnace is shown, by way of example, in the figure. Particularly when melting rocks, it is conventional to use cupola furnaces.

The melt 26 passes into a forehearth 27 and is distributed into several fiber-separation units A, B and C. In the drawing, the melt outlet openings are located with nipples 2 in the base of the forehearth 27. It is also possible to provide crucibles containing the melt outlet openings 3 below the forehearth and separate from this, which crucibles are fed from the forehearth.

The mineral fibers issue from the subsonic diffuser 12 of the fiber-separation units A, B and C, carried by the mixture of blasting air and propellant air at a speed of preferably less than 20 m/s. A binder spraying device 28 is provided below each subsonic diffuser 12, the binder being applied to the fibers in the form of small droplets.

The fibers are deposited on the conveyor belt 29 by suction-removal of the air transporting the fibers below the perforated conveyor belt. A fan 30 is provided for the suction-removal. The air is then supplied to a purification stage 31 in which for example, suspended binder droplets are removed.

The raw mat 32 formed on the conveyor belt 29 is compressed to the required thickness between the lower conveyor belt 29 and an upper conveyor belt 33 and is introduced into a hardening furnace 34 in which the binder is hardened.

EXAMPLE

A melt consisting of basalt and limestone flows continuously into a funnel-shaped platinum boat which has a length of 550 mm, on the lower edge of which 100 melt outlet openings are provided in the form of projecting nipples with bores, 2 mm in diameter and with a mutual spacing of 5 mm, at a temperature of 1300° C., so that a filling level of 80 mm is maintained in the boat. A slit-shaped drawing nozzle according to the invention is positioned below the boat as in FIG. 4, which drawing nozzle has a narrowest cross-section of 5 mm and whose inlet part has a curvature with a radius of 1.5 mm. The diverging portion of the nozzle has a length of 35 mm and an expansion angle of 2°. Compressed air of 6 bars is introduced into the compressed gas supply lines and is blown into the mixing zone through Laval nozzles at a speed of 550 m/s. The quantity of propellant is 1500 kg air/h, so that a pressure of approximately 0.25 bar is maintained at the outlet of the diverging portion. Small hydrogen-flames flow against the melt outlet openings on both sides, so that the hot gas produced, surrounding the melt streams, constitutes approximately 7% by volume of the throughput of blasting medium also of approximately 1500 kg/h. The mixing zone is 20 mm long. The region with a constant cross-section has a length of 4 mm and a width of 5.5 mm. The subsonic diffuser connected thereto has an expansion angle of 7° and a length of 500 mm. Dividing plates are also positioned alternately, each at a spacing of 100 mm. The throughput of melt in the nozzle amounts to 350 kg/h. Rockwool fibers approximately 5 $\mu$m thick, with an average length of 50 mm issue at the diffuser outlet. The pearl content is less than 3%.

A mat formed from the wool has a density by volume of 15 kg/m$^3$. The heat conduction number of the 5 cm thick mat is 0.036 W/mK.

It will be appreciated that the instant specification and examples are set forth by way of illustration and not limitation, and that various modifications and changes may be made without departing from the spirit and scope of the present invention.

We claim:

1. In a process for the production of mineral wool fibers according to the jet blast process, comprising issuing at least one melt stream from at least one opening in the base of a melting crucible into a converging-diverging drawing nozzle, flowing a gaseous blasting medium into the nozzle substantially parallel to the melt stream so as to separate the melt stream into fibers, the blasting medium being drawn into the nozzle by suction due to a pressute drop produced between the nozzle inlet and outlet, and passing the fibers and spent blasting gas into a diffuser connected downstream of the nozzle to reduce the gas flow rate, the improvements which comprise effecting (a) a maximum drop pressure in the inlet of the drawing nozzle;
    (b) a minimum drop pressure in the diverging portion of the drawing nozzle over a maximum length without separation (transition) of the laminar boundary layer;
    (c) the subsequent pressure conversion initially with a shock at a constant cross-section of the drawing nozzle and subsequently in a subsonic diffuser.

2. Process according to claim 1, wherein the pressure drop is effected by propulsion jets flowing in at the end of the diverging portion.

3. Process according to claim 2, wherein the propulsion jets are mixed with the blasting medium at constant pressure.

4. Process according to claim 1, wherein the melt outlet openings are at a spacing from the drawing nozzle at which there is a pressure of from 0.92 to 0.98 × ambient pressure of the crucible.

5. Process according to claim 1, wherein the ratio of the pressure at the end of the diverging portion of the nozzle to the surroundings of the crucible is from about 0.2 to 0.4.

6. Process according to claim 1, wherein air at ambient temperature is used as the blasting medium and hot gas flows surrounding the melt stream when issuing from the crucible.

* * * * *